United States Patent [19]

Numakura et al.

[11] Patent Number: 4,811,108
[45] Date of Patent: Mar. 7, 1989

[54] TONAL CONVERSION METHOD FOR PICTURES

[75] Inventors: Takashi Numakura; Iwao Numakura, both of Tama; Susumu Kitazawa, Kawasaki, all of Japan

[73] Assignee: Yamatoya & Co., Ltd., Japan

[21] Appl. No.: 166,101

[22] Filed: Mar. 9, 1988

[30] Foreign Application Priority Data

Mar. 11, 1987 [JP] Japan .................................. 62-55831
Jan. 11, 1988 [JP] Japan .................................. 63-2590

[51] Int. Cl.$^4$ .............................................. H04N 1/21
[52] U.S. Cl. ...................................... 358/298; 358/283
[58] Field of Search ............... 358/296, 298, 300, 283, 358/284

[56] References Cited

U.S. PATENT DOCUMENTS 4,680,646 7/1987 Ikeda et al. ........................ 358/298

OTHER PUBLICATIONS

Principles of Color Reproduction, John Wiley & Sons, Inc., 1967, pp. 110-111, by J. A. C. Yule.

Primary Examiner—E. A. Goldberg
Assistant Examiner—Lincoln Donovan
Attorney, Agent, or Firm—Lowe, Price, Leblanc, Becker & Shur

[57] ABSTRACT

An original continuous-tone picture is converted into a halftone picture, which is to be reproduced, on the basis of pictorial information from the original picture. The information is processed in such a way that the base density of a desired control point on the original picture and the halftone intensity of a corresponding control point on the halftone picture are correlated in accordance with a specific conversion formula.

6 Claims, 1 Drawing Sheet

TONAL CONVERSION METHOD FOR PICTURES

FIELD OF THE INVENTION

This invention relates to a tonal conversion method of a picture to be used upon formation of reproduced pictures such as printed halftone pictures and other binary pictures (which will hereinafter be called 37 reproduced pictures" collectively) from an original continuous-tone picture such as painting, monochrome picture or color picture, in other words, upon reproduction of halftone pictures. The term "picture" as used herein should be interpreted in a broad sense so that it embraces not only pictures itself but also images.

More specifically, the present invention is concerned with a novel tonal conversion method for a picture, which is applicable to various tone reproduction methods adopted upon reproduction of a continuous-tone picture, for example, the variable-area gradation method in which a gradation or tone is expressed depending on the size of each dot as observed in printed pictures and the like, the density gradation method in which a gradation is expressed in accordance with the density of each minute picture element to be recorded (per dot) as seen in the heat-sensitive transfer (sublimation transfer) method and gravure plate-making process, the method in which the reproduction of a gradation or tone is achieved by adjusting the number of dots or the number and size of ink droplets to be recorded per picture element (unit area), and hybrid tone reproduction method making use of two or more of these gradation methods in combination, so that the continuous tone of an original picture can be converted rationally and scientifically into the halftone of a picture to be reproduced.

BACKGROUND OF THE INVENTION

Reflecting the ever-increasing demand for pictures having higher quality, it is required to reproduce the gradation or tone of an original continuous-tone picture correctly in a reproduced picture upon making a print or copy from the original picture or printing out the original picture by means of a printer. The term "original continuous-tone picture" as used herein should be interpreted in a broad sense, so that it may embrace soft originals composed of electronic data from image-related computers, TV sets (including high-definition TV sets), video recorders, electronic still cameras (video floppies), etc., to say nothing of hard originals such as paintings, monochrome pictures, color pictures, handwritten manuscripts, freehand drawings and the like.

The reproduction of original continuous-tone pictures is dealt with in an extremely wide range of industry and technical field as already mentioned above. Many problems however still remain in expressing the tone of an original picture suitably in the tone of a picture to be reproduced, namely, in the reproduction of the tone of the original picture. It is hence the current circumstances that no rational and scientific technique has been established yet for the conversion of a tone.

Taking, for example, printing which is a representative industry and technical field, the abovementioned problems will hereinafter be described.

When a printed picture of a halftone is produced from a photographic original of a continuous tone by using a photomechanical camera or the like or a printed picture of a halftone is produced from a photographic color original by performing color separation of the photographic original by means of an electronic color separation apparatus (monochrome scanner, color scanner), it is indispensable to convert the tone of the original picture from the continuous tone to the halftone upon production of the printed picture as is known very well.

Non-scientific approaches have however been taken in the tonal conversion of pictures in the conventional photomechanical technology [including both photomechanical processes for making original films (e.g., halftone positive films and halftone negative plate. The same definition will be applied hereinafter.) by using photographic techniques and electromechanical processes for making original films electronically]. Namely, no satisfactory scientific analysis and study has heretofore been conducted with respect to such issues as what gradation characteristics a halftone picture for a photomechanical process should have upon production of a printed picture of a halftone from an original continuous-tone picture, how a gradation characteristic curve should be specified as a standard work curve for obtaining such a halftone picture useful in the photomechanical process, and how such a gradation characteristic curve should be obtained rationally. In fact, these issues have heretofore been dealt with depending primarily on the experiences and perception of photomechanical technicians or empirical and personal judgements of design engineers of electronic color separation apparatus (scanners).

The above-mentioned manner of solution still prevails even the present day of wide spread adoption of total scanners, one of very expensive and technically advanced photomechanical equipment, in the present field of art relating to photomechanical processes and printing. Incidentally, a standard work characteristic curve is employed as a standard or reference when a tonal conversion is effected by performing halftone scanning or both color separation and halftone scanning with advanced photomechanical equipment such as monochrome scanner or color scanner. This standard work characteristic curve is a characteristic curve of a halftone picture, which is to be used as a standard or reference upon performing halftone scanning or color separation. It is also called "halftone characteristic curve" in connection with monochrome scanners and "color-separation characteristic curve" in the case of color scanners. Such a standard work characteristic curve is determined by the knowledge of engineers of manufacturers of these equipment. Their knowledge is based on experiences and perception. Under the circumstances, users rely upon a standard work characteristic curve stored beforehand in the memory of their equipment or a standard work characteristic curve determined on the basis of the experiences and perception of the users.

Accordingly, the tonal conversion of the continuous-tone of an original picture into the halftone of a printed picture is not performed rationally and scientifically in the photomechanical technology. This has prevented the rational systematization of the overall photomechanical technology.

From the realities, photomechanical work is carried out by using a variety of advanced electronic color separation apparatus (scanners) in order to produce printed pictures. The photomechanical work is however still accompanied by problems such as those to be mentioned below.

(i) Problems pertaining to the tonal expression of intermediate tone:

(a) In spite of today's wide-spread adoption of advanced photomechanical equipment, it is difficult to achieve the gray balance (density balance) of an intermediate tone. The term "intermediate tone" as used herein means the tone of a halftone area, whose dot area percentage ranges from about 40% to about 80%, on a print.

(b) The color of the intermediate tone is dull and does not have any vivid tone.

(c) It is difficult to emphasize or stress the intermediate tone.

(d) The delicate gradation of the intermediate tone (which is of course related closely to the gradation and tone of the entire pattern) can not be reproduced well.

Reflecting the above problems, re-scanning is required to the following extents in actual work.

About 10% in color-separation work where usual quality is required.

About 20%–30% in color-separation work where high quality is required.

It is the poor color balance of the intermediate tone in the printed picture that accounts for a major part of causes for the re-scanning. Under the circumstances, the poor color balance amounts to about 30%–40% of the whole causes.

(ii) Problems relating to the preparation of a standard work characteristic curve for processing a non-standard color original:

A color separation characteristic curve (i.e., tonal conversion curve), which is a standard work characteristic curve required for the production of a printed picture having desired quality, must be determined relying upon the experiences and perception of workers, for example, when it is desired to perform color separation on a non-standard color original, namely, a non-standard color original having quality other than that of standard color originals taken into consideration upon designing a color scanner or the like (i.e., an original not subjected to proper exposure and/or development) or when it is desired to perform color separation similarly by using a color separation characteristic curve other than that stored beforehand in a color scanner of the like. Further, tremendous time, cost, labor and experiences are also required upon inputting basic data in a color scanner in order to obtain such a characteristic curve.

In the case of a non-standard color original containing a color fog in the high-light area thereof, its color separation work is confused so that the quality is not stabilized. Such non-standard originals now account for as much as 30–40%.

(iii) Operational problems of scanners:

(a) A very long period of time is required until an operator learns the operation technique of a scanner, receives training on the scanner, and then masters it well.

(b) The product quality varies when the technician or operator is replaced, whereby the product quality can hardly be unified and stabilized.

(c) The product quality changes considerably depending on the place of work or the operator, even when the same scanner is used.

(d) The high performance of a scanner may not be fully utilized in many instances.

(e) It becomes difficult to make products of the same quality when an original is replaced by another original having different quality or contents.

(f) It is very difficult to make a product whose quality meets the customer's desire.

(g) It is difficult to unify the quality of products when a great deal of originals are received at once and their processing must be performed at plural work places.

(h) Mutual understanding is not achieved well between scanner manufacturers and those dealing with plate-making and printing, regarding the equipment and the quality of products.

(iv) Lack of scientific approach for the production of halftone pictures suitable for use in the photomechanical process:

(1) Further, design engineers of electronic color separation apparatus (scanners) and the like do not have full understanding of plate-making and printing techniques. This lack of understanding has resulted in the lack of flexibility in work by the apparatus, thereby failing to solve various problems such that diversified needs of print orderers can hardly be met, photomechanical engineers have difficulties in experimenting and developing new creative color separation methods, and jumping takes place in the gradation of a halftone picture in spite of the use of the apparatus.

(2) As a more fundamental problem, it has not been attempted to establish a universal and rational, tonal conversion method for the tonal conversion of an original continuous-tone picture into a printed halftone picture, which tonal conversion is indispensable for the production of the printed picture. For this reason, various confusions have been induced unnecessarily regarding tonal conversion not only in the photomechanical business but also in the printing business and even on the side of orderers for prints.

The picture forming technique described above placing emphasis on printed pictures will next be summarized from the viewpoint of picture or image processing techniques including other techniques for the formation of pictures.

Picture processing techniques adapted to form reproduced pictures such as binary pictures and multivalued pictures from continuous-tone pictures include indirect picture processing methods for obtaining a reproduced picture from pictorial information of an original via an intermediate soft picture such as color separation characteristic curve or halftone characteristic curve as well as direct picture processing methods for obtaining a reproduced picture directly from pictorial information of an original. A typical example of the former methods is a scanner-dependent picture processing method employed upon production of a printed picture, while representative examples of the latter methods include the picture processing method for obtaining a CRT picture for a color separation monitor, a heat-sensitive transfer picture, a reproduced ink-jet picture, a reproduced toner picture or the like.

It is common to these picture processing methods that electronics, computer, mechatronics and the like are employed as technical means and an analog processing method and/or digital processing method is relied upon as a processing method of pictorial information.

However, none of these picture processing methods and picture processing techniques includes any scientific and rational technique for the tonal conversion of pictures. Most of the picture processing techniques described above have a function to control the tone of a picture and the luminance of each picture element. However, their controls are, as a matter of fact, dependent heavily on the experiences and perception of a man.

The adjustment of the tonal conversion of a picture on the basis of the experiences and perception of a man is in fact the fundamental cause for the various problems which arise upon formation of a reproduced picture such as binary picture or multivalued picture from an original continuous-tone picture. The above adjustment is a fundamental matter which should be rationalized as soon as possible in the present picture processing techniques.

OBJECT AND SUMMARY OF THE INVENTION

As has already been described above, the tonal conversion of a picture is performed based fully on the experiences and perception of a man although the tonal conversion takes an extremely important role in the entire picture processing technology. An object of this invention is therefore to improve the above tonal conversion to a scientific and rational tonal conversion technique of a picture by using a tonal conversion formula developed newly for the picture.

The tonal conversion technique will next be described in detail with respect to a picture processing technique of a photomechanical process for printed pictures.

The true cause for the occurrence of the above-described various problems of the present field of art was found to reside in the fact that the tonal conversion step of an original picture (continuous tone picture), which is the first step of work upon production of a printed picture (halftone picture) from the original picture and plays the most important role in the work, was regarded as "not involving any technically and practically rational means for the tonal conversion of the original picture and being performed satisfactorily depending primarily on the experiences and perception of a man". Paying attention to the above fact, the present inventors have carried out an extensive investigation under the basic belief that the establishment of a scientific and rational tonal conversion technique of a picture is indispensable in order to achieve eternal rationalization of the photomechanical process and its practice.

In particular, the present inventors have learnt through many cases that the quality of tonal conversion of a picture directly affect not only the quality of the gradation of a printed halftone picture but also the quality of its tone. From this fact, a fundamental error or defect is believed to exist in the conventional approach that a photographic color original is subjected to color separation by a scanner to make an original film for color printing. In the conventional scanner operation, the analysis of a color has been considered to be most important (this is called "color-correction-first-ism"), and its has not been taken into due consideration how much influence a variation in each dot area, which is an extremely important finding in connection with plate-making and printing, would be given to the changes in gradation or tone of a printed picture (this is called "tone-rendering-first-ism"). This can be understood easily provided that articles on the color separation technology or scanners are simply referred to [J. A. C. Yule, "Principles of Color Reproduction", PP 110–111, John Wiley & Sons, Inc. (1967)].

The foregoing is however believed to be extremely strange in view of the objective facts that fundamental elements visualizing a printed picture are two elements, i.e., "dot area" and "reflection ink density" which occurs on each dot and the visual sensation of a man can easily distinguish as a density difference a difference as small as 1% or even smaller in size between dots, namely, between dot areas.

In this respect, the present inventors have the following view.

Namely, the present color separation technique (which is also the basic technique for the designing of scanners and the like) is dependent heavily on the photographic picture and photographic processing technology in view of the process of its development. For this reason, the basic concept for the formation of a picture to be printed has inclined too much toward the technique for processing photographic pictures, so that the understanding, study and analysis of the nature of printed pictures and the work steps of printed pictures have been insufficient.

The characteristic features of the present color separation technique reside in that (1) in the adjustment of a picture, color adjustment, color correction and the like are considered to be more important than the control of the gradation and tone of the picture, especially the control of the gradation of the picture and (2) it is considered to be sufficient for the control of the gradation of the picture if a halftone characteristic curve (also called "gradation curve"; this serves as a standard or reference for tonal conversion by a scanner) defining the relationship between a density on the original picture and the size of its corresponding dot, said curve being a work standard curve for producing a halftone picture, is controlled at three points on the original picture, namely, at the smallest dot (the brightest point H) in the high-light area on the original picture, the largest dot of the shadow area (the darkest area S) and an intermediate-density point (intermediate density: $M_1$) (this will hereinafter be called "3-point control method).

As described above, there is however a substantial limitation to the formation of a printed picture excellent in the reproduction of gradation and tone of an original picture from the original picture under the present color separation technique in view of the facts that (1) the basic elements for the visualization of the printed picture are both "the area of each dot" and "the reflection ink density" to be observed on the dot, in other words, the gradation and tone of the printed picture is related closely to "the area of each dot" and (2) there is a problem in the reproduction of an intermediate tone (an area having dot area percentages of about 40–80%) in the operation of a today's advanced scanner, for example, a point ($M_2$) having a dot area percentage of 50% is not controlled in a halftone characteristic curve (the present inventors have already learnt the importance of the 4-point control method including the above $M_2$ together with the above-described H, $M_1$ and S from many cases).

As is understood from the three point control method mentioned above, the conventional tonal conversion method of an original continuous-tone picture into a halftone picture to be printed makes use of an advanced color separation apparatus (scanner) but involves no rational means for correlating scientifically and eternally the value at a desired control point on the continuous-tone picture with the value of dot area percentage of dots on its corresponding half-tone picture although their correlation is considered to be the crux of tonal conversion.

In addition, the study of tonal conversion techniques of an original picture for the formation of a reproduced picture from the original picture has been rendered more difficult due to the fact that the densities of H and S of the original picture, the density gradation characteristic curve ranging from H to S, the surface reflectivity of a base material for visualizing a picture to be printed, such as printing paper sheet and/or the density of a picture visualizing material such as printing ink always vary in widely. As a result, its study has not been conducted fully to date.

The present inventors have carried out an extensive investigation with a view toward breaking up the above-mentioned limitation of the conventional conversion techniques. As a result, the present inventors have found a novel tonal conversion method for an original continuous-tone picture, which can always provide a reproduced picture having natural gradation and tone to the visual sensation of a man in each case by correlating the density of a desired control point on the original continuous-tone picture with the dot area percentage of its corresponding control point on a printed picture.

In summary, the present invention relates to a method for the tonal conversion of an original continuous-tone picture (including any continuous-tone halftone picture such as painting, monochrome photographic picture, photographic color picture, negative photographic picture, positive photographic picture, photographic transparent picture, or photographic reflection picture) into a halftone picture, which is to be reproduced, on the basis of pictorial information obtained from the original continuous-tone picture by photoelectrically scanning the original continuous-tone picture by way of example, which comprises processing the pictorial information (for example, as electrical signals of pictorial information) in such a way that the base density (x) (a value obtained by subtracting the density at the brightest point H of the original continuous-tone picture from the density at the desired control point) and the halftone intensity (y) of a corresponding control point on the picture to be reproduced are correlated, for example, x and y processed as defined by the following conversion formula (1) are used.

$$y = y_h + \frac{\alpha(1 - 10^{-kx})}{\alpha - \beta}(y_s - y_h) \quad (1)$$

where
- x: the base density of the desired control point X on the original continuous-tone picture, namely, a value obtained by subtracting the density at the brightest area H of the original continuous-tone picture from the density at the desired control point X of the original continuous-tone picture;
- y: the halftone intensity of the corresponding control point Y on the picture to be reproduced, such as a printed picture, as expressed in terms of dot area percentage or the like;
- $y_h$: a desired halftone intensity set for the brightest area of the picture to be reproduced, such as the picture to be printed, as expressed in terms of dot area percentage or the like;
- $y_s$: a desired halftone intensity set for the darkest area of the picture to be reproduced, such as the picture to be printed, as expressed in terms of dot area percentage of the like;
- α: the reflectivity of a base material on which the halftone picture is to be reproduced;
- β: the surface reflectivity of a medium for visualizing the halftone picture; and
- k: the ratio of the density range of the halftone picture to be reproduced to the density range of the original continuous-tone picture.

DETAILED DESCRIPTION OF THE INVENTION

Features of the present invention will hereinafter be described in detail.

The method of this invention for the tonal conversion of an original picture (which may be either a hard original or a soft original such as electronic information) can be used either directly or indirectly when it is desired to change the tone of the original picture rationally in any technical field where a reproduced picture, such as printed picture, copied picture or picture printed by a printer, is formed from the original picture.

The expression "direct or indirect utilization of the method of this invention for the tonal conversion" as used herein has the following meaning.

For example, in an electronic plate-making process making use of a scanner for the production of a print, the direct utilization means a mode of utilization in which an original picture is photoelectrically scanned by means of a photomultiplier or CCD (charged coupled device) to obtain information on the density of the original picture, the information is converted into electrical signals as pictorial information, such as voltages, the electrical signals are processed in accordance with the conversion formula (1) to obtain electrical signals (voltages) corresponding to dot area percentages, and the exposure is then controlled on the basis of the latter electrical signals to directly form a halftone picture to be printed, while the indirect utilization indicates another mode of utilization in which the continuous tone of an original picture is converted into another continuous tone by using the conversion formula (1) and the conversion of the picture of the thus-converted continuous tone into a halftone picture is effected in accordance with a conventional method or a further mode of utilization in which a dot area percentage corresponding adequately to the density of a desired control point of an original picture is measured in advance by a transmission densitometer capable of converting the densities of a continuous tone into their corresponding halftone area percentages or by a similar device, thereby to determine whether a plate-making operation by a scanner is performed correctly or not. In the latter modes of utilization, pictorial information, for example, electrical signals bearing the pictorial information is considered to be used indirectly.

Although the method of this invention for the tonal conversion of a picture can be used in a variety of fields as mentioned above, the features of the present invention will next be described in detail in connection with a tonal conversion method of a picture for producing a printed picture for the sake of convenience.

The following objective facts and empirical rules have been known with respect to a printed picture, namely, a halftone picture. Namely, there are two basic elements expressing or visualizing the printed picture, i.e., "dot areas" and "the reflection density of an ink". Regarding "the reflection density of the ink", it has been known empirically that in order to conduct printing while reproducing dots in the high-light area H and shadow area S on a printing plate correctly on a sheet of printing paper, namely, in order to perform adequate printing, the amount of the ink must be controlled within about ±10% relative to an appropriate ink amount on a printing machine (in the case of a black plate, the amount of an ink may be controlled within a range as wide as about ±20% in some instances so as to improve the quality of the picture or black characters or letters.). From experiences, it has been known that the visual sensation of a man can easily distinguish a difference as small as 1% between "dot area" percentages as a density difference and the accuracy of the visual sensation is hence superior to densitometers. It has also been known empirically that the area at the same dot may vary by a degree as much as several tens percentages in a plate-making or printing operation. In view of these objective facts and empirical rules, it is readily understood that the control of the area of each dot is extremely important in the production of a printed picture as a halftone picture.

Incidentally, it is a well-known fact that the size of each dot (dot area percentage) varies depending on the state of the grain of the surface of a plate material at the time of plate-making, properties of a photosensitive material, the degree of deformation of the corresponding dot on an original printing film, variations of exposure (causes for such variations: exposure time, reduction of radiation power of a lamp, etc.), the temperature, viscosity and degree of kneading of an ink at the time of printing, the composition, temperature and amount of damping water, the surface conditions of paper, the printing pressure, etc. and hence gives considerable influence to the quality of the resultant picture. Diametrical variations of a dot (circular dot, square dot, or the like) and the degrees of their deviations from a standard dot area are tabulated below. The importance of control of the dot size is appreciated in view of the fact that a slightest change (5-10μm) in dot diameter leads to an appreciable change to the picture quality, in other words, gives influence to the visual sensation of a man. It is also understood easily that variations in dot size are greater than the above-mentioned variations in "the reflection density of a printing ink" as shown in the following table.

Diametrical Variations of Dot and
Degrees of Deviations from Standard Dot Area
(Rates of increases and decreases of dot area
as calculated based on the standard dot)
(Unit of dot diameter: 1/100 mm)

| −1/100 mm | −0.5/100 mm | Dot diameter | +0.5/100 mm | +1/100 mm |
|---|---|---|---|---|
| 55.56% | 30.56% | 3 | 36.11% | 77.78% |
| 36.00% | 19.00% | 5 | 21.00% | 44.00% |
| 30.56% | 15.97% | 6 | 17.36% | 36.11% |
| 26.53% | 13.78% | 7 | 14.80% | 30.61% |
| 20.99% | 10.80% | 9 | 11.42% | 23.46% |
| 17.36% | 8.88% | 11 | 9.30% | 19.01% |
| 15.97% | 8.16% | 12 | 8.51% | 17.36% |
| 14.79% | 7.54% | 13 | 7.84% | 15.98% |
| 12.89% | 6.56% | 15 | 6.78% | 13.78% |
| 10.80% | 5.48% | 18 | 5.63% | 11.42% |
| 9.30% | 4.71% | 21 | 4.82% | 9.75% |
| 8.16% | 4.12% | 24 | 4.21% | 8.51% |
| 7.02% | 3.54% | 27 | 3.60% | 7.27% |

Note:
The above figures are all theoretical values. The following equations were employed.
(a) When the dot size became larger:

Rate of increase of dot area = $\{(S_p)^2 - S^2\} \times \frac{1}{S^2}$

S: Diameter of the standard dot
$S_p$: Diameter of the enlarged dot
(b) When the dot became smaller:

Rate of decrease of dot area = $\{S^2 - (S_m)^2\} \times \frac{1}{S^2}$

S: Diameter of the standard dot
$S_m$: Diameter of the reduced dot

In relation to the matter mentioned above, photomechanical plate-making work involves the following background characteristics. Namely, original pictures have a wide variety of quality and details. The step for the formation of a printed picture, which follows the photomechanical plate-making work, is diversified and moreover, each of such diversified kinds of printed-picture forming steps has its own work characteristics. Base materials such as printing paper sheets nd color materials such as printing inks, which are both used to express or visualize pictures to be printed, have various properties. Furthermore, the quality evaluation standard for printed pictures varies from one orderer for prints to another.

In order to absorb and overcome such complex and unstable factors involved in the photomechanical plate making work and printing work, it is therefore essential to provide means for allowing to choose the smallest dot $(Y_h)$ at the brightest area and the largest dot $(Y_s)$ at the darkest area in a halftone picture to be produced (to be printed) as desired upon conversion of a continuous-tone picture into a halftone picture and further for allowing to rationally and easily set and control the tones of a picture, said tones ranging from the brightest area to the darkest area, to desired tones.

It is the above-described tonal conversion method of this invention, specifically, the tonal conversion method defined by the conversion formula (1) that has been created and devised in light of such an approach. The tonal conversion method will hereinafter be called "the present conversion technique".

When "the present conversion technique" is applied to a tonal conversion method of a picture upon production of a printed picture, the above conversion formula (1) is used to determine the value (y) of the dot area percentage of the dot at a control point (Y) on a picture, which is to be printed, from the base density (x) of a corresponding control point (X) on an original picture while freely selecting the sizes $(y_h, y_s)$ of dots desired to be placed in the high-light area H and shadow area S of the picture, which is to be printed, on the basis of the values of the reflectivity (α) of printing paper, the surface reflectivity ($\beta$) of a printing ink, and the ratio (k) of the density range of the picture to be reproduced to the density range of the original picture.

The measurement of these densities is generally performed by using a color densitometer (transmission type, reflection type, dedicated type, shared type, or the like). When a scanner is used, they may be measured by a density measurement device which the scanner is equipped with.

Upon utilization of "the present conversion technique", it is also feasible to incorporate necessary soft data or information in the processing unit for pictorial information and/or electrical signals so that densities thus measured may be employed as they are instead of the base density (x).

The above-described conversion formula (1), which is useful in determining dot area percentages (y), was derived from the density formula (photographic density, optical density) accepted widely, namely, $$D = \log I_o/I = \log 1/T$$

where $I_o$: intensity of incident light,
I: intensity of light reflected or transmitted, and
$T = I/I_o$ = reflectivity or transmittance.

The above general formula for the density D may be applied to plate-making and printing in the following manner.

Density (D') in plate-making and printing = log $I_o/I$
= log (unit area × reflectivity of paper)/
{(unit area − dot area) × reflectivity of paper +
dot area × surface reflectivity of ink}
= log $\alpha A/[\alpha\{A − (d_1 + d_2 + \ldots + d_n)\} + \beta(d_1 + d_2 + \ldots d_n)]$ where A: the unit area,
$d_n$: the area of each dot in the unit area,
$\alpha$: the reflectivity of the printing paper, and
$\beta$: the surface reflectivity of the printing ink.

In the present invention, the density formula (D') for plate-making and printing was incorporated with the above-described requirement for the maintenance of correlation between the base density (x) at a desired control point on a continuous-tone picture and the dot area percentage (y) of the dot at the corresponding control point on a resulting halftone picture, whereby the conversion formula (1) has been derived so as to bring a theoretical value into substantial conformity with its corresponding value measured actually.

Therefore, the method of this invention for the tonal conversion of an original continuous-tone picture into a halftone picture to be printed can be applied to any tonal conversion method so long as the conversion of the tone of a picture is effected while the aforementioned base density (x) is correlated with the above-described halftone intensity (y) such as dot area percentage. The correlation between x and y in the above conversion formula (1) should therefore be interpreted as illustrative. The present invention is not necessarily limited to the tonal conversion of a picture upon production of a printed picture, which has been described above by way of example. The tonal conversion method of this invention can also be applied either as is or with a certain suitable modification to the tonal conversion of an original continuous-tone picture upon production of a reproduced picture other than printed picture, such as binary picture or multivalued picture, from the original continuous-tone picture.

It is one advantage of the tonal conversion method of this invention that one can know extremely easily—as indicated by the conversion formula (1), for example, by choosing $y_h$ and $y_s$ or $\alpha$ and $\beta$ at will—with what halftone characteristics, namely, with what halftone characteristic curve a halftone picture, which is to be produced, would be expressed or shown, irrespective of the quality and details of an original continuous-tone picture (photographic picture).

"The present conversion technique" may be used by adjusting or modifying it suitably as needed. The tonal conversion or tonal modification (or correction) of a picture may be performed as desired by changing the values $y_h$, $y_s$, $\alpha$, $\beta$, k, $\alpha/(\alpha−\beta)$ ($=\epsilon$) suitably. "The present conversion technique" defined as a basic embodiment of this invention by the above conversion formula (1) therefore has an extremely high degree of flexibility.

This advantage will next be described in detail. Upon application of "the present conversion technique", a user (worker) should keep in mind that "the present conversion technique" has the following freedom.

Freedom 1:

The conversion formula (1) can be used to obtain a printed picture conforming its corresponding original picture very well. Namely, the conversion formula (1) can be applied while giving the priority to the provision of a printed picture which looks exactly the same as the original picture to the eyes of a man. Such a manner of tonal conversion of a picture is described by the term "tonal conversion (of a picture)" in this invention.

Freedom 2:

The conversion formula (1) can be used to change or modify an original picture to obtain printed pictures in light of needs from the viewpoint of photopictures mechanical plate-making and printing techniques, artistic demands, orderers' needs, etc., whereby printed pictures can be obtained. Namely, the conversion formula (1) can be applied while giving the priority to the provision of a visual picture in a form changed (or modified) when observed through the eyes of a man. Such a manner of tonal conversion of a picture is described by terms "tonal change (modification) (of a picture)" in this invention.

In the conversion work of the tone of an original continuous-tone picture upon production of a halftone picture, which is to be printed, from the original continuous-tone picture in accordance with this invention, the above-mentioned tonal conversion or change (modification) can be achieved with ease, specifically, by changing the $y_h$, $y_s$, k value, $\alpha$, $\beta$ and $\epsilon$ value suitably in the conversion formula (1).

In the case of multi-color plate-making (the four plates, namely, cyan plate (C), magenta plate (M), yellow plate (Y) and black plate (BL) are generally considered to make up a unit), once the standard work characteristic curve, namely, the standard halftone characteristic curve of a base plate [in the case of multi-color plate-making, the cyan plate (C) serves as a base plate as known very well in the art] is determined, the standard work characteristic curves of the other color plates can always be determined rationally by multiplying the value y of the base plate with appropriate adjustment values which are based respectively on the gray balance ratios of the corresponding individual printing inks. Moreover, all of the work characteristic standard curves thus determined for the individual color plates are of course rational characteristic curves and moreover, the mutual relationship in gradation and tone among these characteristic curves is also rational and appropriate. So long as the tonal conversion of a picture is conducted in accordance with "the present conversion technique", the adjustment and control of the gradation and tone of a picture to be printed in accordance with a multi-color printing technique can be effected rationally.

By using "the present conversion method" as described above, it is possible to get rid of the conventional tonal conversion method which relies upon experiences and perception, and hence to perform the tonal conversion of a picture as desired and in a rational manner. As a consequence, rational conversion is also feasible with respect to the tone which is related closely and unseparably to the gradation.

In order to rationalize the adjustment or control of a standard work characteristic curve (halftone characteristic curve) further in response to the strong demand therefor, particularly, from the standpoint of photomechanical techniques, the position and number of control points may be changed easily, for example, a desired number of control points may be concentrated at a desired position, for example, around the 50% dot area percentage. The concentration point (point $M_2$) on an original picture, which corresponds to the 50% dot area percentage, has been excluded from consideration in the conventional 3-point control method (H, $M_1$, S). The importance of control of the point $M_2$ has been proven in the 4-point control method (H, $M_2$, $M_1$, S) proposed by the present inventors.

When "the present conversion technique" is used for the conversion of the tone of a picture in this invention, absolutely no limitation is imposed on the purpose, means and method of its utilization. Needless to say, no limitation is imposed on the picture processing technique such as the means and method for the input or output of pictorial information, for example, electrical signals bearing such pictorial information.

When pictorial information (i.e., electrical signals bearing pictorial information) obtained from an original picture by a photoelectric scanning means, a solid-state image sensing device such as CCD or a lens system is processed by a computing means such as halftone-scanning or color-separating electronic calculator in accordance with "the present conversion technique", the conversion formula (1) or its term, values and/or coefficients may be adjusted, modified, converted, omitted, or otherwise changed suitably so long as the rationality of the tonal conversion of a picture is not impaired.

The tonal conversion method of this invention has been described taking the production of a halftone picture, which is to be printed, from an original picture of continuous tone by way of example. The application field of the present invention is however not limited to the printing field.

The tonal conversion method making use of "the conversion technique" of this invention is effective when one wants to reproduce a picture of non-continuous tone, such as binary picture or multivalued picture, from an original picture of continuous tone by relying upon an expression mode such as changes in halftone, i.e., dots or the concentration or luminance of each unit picture element. Namely, the tonal conversion method can of course be applied effectively to the following case.

(i) When it is desired to show a gradation or tone by changing the size of each dot as seen in printed pictures as described above in detail, such as letterpress, lithography, halftone gravure and silk screen pictures (this method is called "variable-area gradation method").

The tonal conversion method can also be applied effectively to the following cases.

(ii) When it is desired to show a gradation or tone by changing the intensity of a pigment or dye (coloring material), like a printing ink, to be caused to adhere per picture element (for example, per dot), which has a uniform area, as seen in fusion-transfer type thermal transfer pictures, (silver-salt utilized) thermally-developed transfer pictures and conventional gravure pictures (this method is called "variable-density gradation method").

(iii) When it is desired to show a gradation by changing the recording density per unit area, for example, the number of dots, the number and/or size of ink droplets, or the like as seen in pictures produced by a digital copying machine (color copies, etc.), printer (ink-jet type, bubble-jet type, or the like) or facsimile [this method is similar to the variable-area gradation method (i)].

(iv) When it is desired to obtain a CRT picture from video signals, TV signals or high-definition TV signals by adjusting the level of luminance of each unit picture element, or to obtain a halftone print or hard copy from the CRT picture.

(As is known very well, not only the abovementioned variable-area gradation method but also a method for expressing or showing a gradation in a multi-valued fashion such as the double-tone or complementary color method are used for the production of printed pictures.)

In order to process pictorial information on the densities of a picture obtained from an original picture of continuous gradation (including a hard original or a soft original), for example, electrical signals bearing such pictorial information (which may be either analog or digital signals) in accordance with "the present conversion technique", it is only necessary to process the pictorial information at a picture processing unit (tonal conversion unit) of the above-mentioned equipment in each of the various application fields, to control the current, voltage or impression time thereof at the recording unit (recording head) of the equipment in accordance with a value y (halftone intensity) obtained as a result of the processing, and then to change the dot area, the number of dots per unit area (per picture element), the density per unit area (for example, per dot) to output a picture of non-continuous gradation such as a dot-gradation picture or density-gradation picture. Further, the values of the terms and coefficients in "the present conversion technique" may be determined suitably in each application field.

In addition, "the present conversion method" can also be applied as printing-related equipment such as densitometers equipped with a density gradation conversion system capable of displaying a dot area percentage and the like along with a density, color-separation pre-inspection simulators, and color-separation education simulators.

ADVANTAGES OF THE INVENTION

The tonal conversion method of this invention has brought about the following excellent effects.

(1) A rational and simple means [tonal conversion means and tonal change (modification) means] has been provided for the determination of the relationship between the density of an original picture and its corresponding dot area percentage, more specifically, for the determination of the base density of a certain control point on an original picture (continuous-tone picture) and its corresponding dot area percentage on a printed picture (halftone picture), namely, for obtaining rational halftone characteristics, which a printed picture is supposed to have, and a halftone picture having such characteristics, although the above determination has heretofore been made by relying upon each worker's judgement which is based on his experiences and perception.

Accordingly, the present invention can rationally systematize the theory and techniques of a work process for obtaining a halftone picture. This means that this invention has provided a basis for the rationalization of not only the photomechanical plate-making step but also the entire process for the formation of a printed picture and also for the systematization of the related art.

(2) By having the tonal conversion system of photomechanical plate-making equipment perform the tonal conversion method of this invention, the image adjustment system which is a major cause for the current confusion in the use of an electronic color separation apparatus becomes no longer needed, so that the equipment can be rationalized and simplified and the production cost can hence be cut down. The operation of such equipment is also simplified and rendered straight forward, whereby the redoing of the work can be reduced to an extreme extent (to about 10% or less of the present level).

(3) Owing to the clarification of the procedure of tonal conversion or tonal change (or modification), the redoing of the work has been reduced significantly, thereby making a considerable improvement to the efficiency of the work. Accordingly, the productivity can be improved and at the same time, the consumption of expendable supplies can be reduced significantly.

(4) A standard can be set up rationally and easily for the quality evaluation of printed pictures independently of the quality and details of original pictures.

In other words, a rational technical medium can be provided commonly to an orderer of prints and a photomechanical engineer. It is hence ensured to achieve mutual understanding with extreme ease between the orderer and photomechanical engineer.

(5) The tonal conversion method of this invention has provided technical flexibility sufficient to meet needs of an orderer of prints in the course of production of a printed.

(6) The tonal conversion method of this invention has rationalized and simplified the work for inputting standard work characteristic curves (color-separation characteristic curve, halftone scanning characteristic curve), which a worker wants to use, in a color scanner or the like. The time of the work can hence be shortened to 1/5–1/10 of the present time.

It is hence possible to eliminate the limitation to the workability, which has heretofore been imposed on conventional color scanners, so that the operational flexibility of the color scanners has been broadened significantly.

(7) The tonal conversion method of this invention has effectively solved the problem in the expression of the gradation of an intermediate tone, the problem of color fogging in the high-light area of a color-film original and the problem of a jump-up in gradation (i.e., the phenomenon that a discontinuous tone jump is observed in the gradation of a printed picture), all of which have remained as serious practical problems in the present field of art.

(8) It has become feasible to rationally judge the quality of the tonal conversion function employed in each of the present photomechanical equipment.

It has also become possible to apply a scientific approach for the solution of various problems in color separation work. For example, it is now possible to rationally distinguish tone adjustment (maintenance of good gray balance over the entire tone range of a printed picture), color change, color correction, color modification and retouching in the control of a picture in a color-separation operation. Owing to these features, the tonal conversion method of this invention has provided an extremely effective means for the rationalization of the process of photomechanical work.

(9) The use of the tonal conversion method of this invention has made it possible to rationally and easily set up a standard for the quality evaluation of a printed picture or halftone picture independently of signals corresponding to the pictorial information of an original picture. Coupled with the possibility of provision of density gradation characteristic curves for the high-light area, shadow area and high-light to shadow area of the original picture, it is possible to substantially rationalize the system of the present advanced photomechanical equipment.

(10) It is possible to effectively conduct the education and training of engineers, which are considered to be indispensable in view of the advancement of photomechanical equipment.

In addition, it has become feasible to use a scientific approach for the solution of various problems pertaining to the photomechanical process, especially, color separation work. It is hence possible to avoid unnecessary labor in the daily work and to secure sufficient time for new and creative R & D activities.

(11) When an original picture has standard quality upon performing color-separation work by using the present invention or a newspaper printing plate, which is desired to shorten extremely the time required for its photomechanical fabrication, is made, the tonal conversion method of this invention permits the materialization of the so-called direct plate process which omits proof.

EMBODIMENTS OF THE INVENTION

The tonal conversion method of this invention will hereinafter be described in further detail, especially, on the basis of embodiments in each of which an original picture of continuous tone is converted into a halftone picture to be printed. It should however be borne in mind that the present invention is not limited to or by the following embodiments so long as the essential features thereof are not departed.

(i) Outline of the tonal conversion method making use of "the present conversion technique":

First of all, the outline of a typical tonal conversion method making use of "the present conversion technique" will be described with reference to FIG. 1.

Depending whether conversion (or change, modification, or the like is direct or indirect, tonal conversion methods for pictures may be classified basically into methods for directly converting a continuous-tone picture having a linear density gradation characteristic curve into a halftone picture and methods for firstly performing the tonal conversion of a continuous-tone picture into another continuous-tone picture and then transforming the thus-converted continuous-tone picture into a halftone picture (since the tonal conversion has been performed, the term "transform" is used here to distinguish it from the conversion).

Each of the above-mentioned methods includes two approaches depending whether a density range is compressed or not, namely, one for converting the density range of a continuous-tone picture directly into a halftone density range without compressing the former density range and the other for converting the density range of a continuous-tone picture into a halftone density range by way of an intermediate picture having a density range corresponding to the halftone density range of a picture to be printed.

It is the present state of art that in an actual platemaking operation, a method suitable for the purpose and environment of the operation is selected from tonal conversion methods obtained by combining such basic methods in various ways.

As a representative example, FIG. 1(a) shows one embodiment in which a continuous-tone picture (original picture) having a linear density gradation characteristic curve is proportionally compressed to obtain an intermediate picture of a compressed density range and the intermediate picture is then converted into a halftone picture. In this case, "the present conversion method" can be used as is.

On the other hand, FIG. 1(b) depicts another embodiment in which a continuous-tone picture (original picture) having a linear density gradation characteristic curve is tonally converted and at the same time, its density range is compressed to obtain an intermediate halftone picture having a compressed density range, and the intermediate picture is then transformed proportionally into a halftone picture. In this case, an intermediate picture (continuous tone) subjected to a desired tonal conversion can be obtained by using the density and k value of the picture as $y_h$ and $y_s$. It is then only necessary to transform the intermediate picture proportionally.

In FIGS. 1(a) and 1(b), $D_o$: The density of an original picture whose gradation is continuous.

$DR_o$: The base density range of the original picture whose gradation is continuous. A value obtained by subtracting the density at the brightest area (H; the smallest dot at the high-light area) from the density at a control point (X) on the original, said density falling within the range $DR_o$, is the base density (x).

$D'_o$: The density of an intermediate picture having a density range obtained by compressing the density range of the original continuous-tone picture by the k value.

$DR'_o$: The density range of the intermediate picture having the compressed density range.

$D''_o$: The density of a continuous-tone picture obtained by converting the tone of the original continuous-tone picture in accordance with "the present conversion method" and also by compressing the density range of the original continuous-tone picture.

$D_p$: The dot area percentage of a halftone picture to be printed.

$DR_p$: The density range of the picture to be printed.

P: Halftone characteristic value based on a quality evaluation standard for a picture to be printed. P value is compared with y value to evaluate their matching.

H: The brightest area on the original (the smallest dot in the high-light area).

S: The darkest area on the original (the largest dot in the shadow area).

$M_1$: An area on the original, which has an intermediate density (intermediate density area).

$M_2$: A density area on the original, which determines the position of the 50% dot (area) on a halftone picture to be printed.

(ii) Outline of practice of a tonal conversion method by "the present conversion technique":

The outline of practice of a tonal conversion method making use of "the conversion technique" of the present invention will next be described.

The procedure of work upon conducting the tonal conversion of a picture by the method of this invention may be divided into the following consecutive steps [the accompanying symbols correspond to those employed in the conversion formula (1) described above].

Regarding an original continuous-tone picture which is to be subjected to color separation, the base density range of the picture (i.e., a value obtained by subtracting the density of the brightest of the original picture from the density of the darkest area of the original picture) is determined.

Next, the base density x at a desired control point (X) on the original picture, which control point has been selected for the purpose of control, (a value obtained by subtracting the density at the brightest area on the original picture from the density at the control point) is determined.

Further, within the base density range of the original picture determined above, the base density (x) of the desired control point (X), the dot area percentage ($y_h$) of the smallest dot at the brightest area in a halftone picture to be obtained, and the dot area percentage ($y_s$) of the largest dot at the darkest area in the halftone picture to be obtained are chosen as desired.

Then, the dot area percentage (y) of the control point (Y) on the halftone picture, said control point (Y) corresponding to the control point (X) on the original picture, is determined in accordance with the conversion formula (1).

The procedure for practicing "the present conversion technique" by an electronic color separation apparatus (scanner), which is the most common equipment, will be described hereinafter.

In order to produce, for example, an original film for a printed picture, a halftone picture, namely, an original printing film by using the tonal conversion method of this invention, a conventional system known well in the present field of art can be used. The production of such an original film can be achieved by incorporating "the present conversion technique" in a color separation halftone scanning device of a commercial electronic color separation apparatus (color scanner or total scanner) or the like.

In the conventional known system, a small spot light is irradiated to the original picture which is a continuous-tone picture. Reflected or transmitted light (pictorial information signals) is received at a phototube (photomultiplier) to convert the intensity of the light into the corresponding voltage level. The resultant electrical signal (voltage) of the pictorial information is adjusted and processed as needed by a computer. Based on the thus-processed electrical signal of the pictorial information (voltage) outputted from the computer, an exposing light source is controlled. Thereafter, a raw stock is exposed to a spot light to produce an original printing film or the like. It is only necessary to incorporate a soft, which has been designed to process electrical signals of continuous-tone pictorial information into electrical signals of halftone pictorial information, in a well-known conventional system adapted to produce an original printing film by irradiating a spot light to a raw stock, for example, in the calculation unit of a computer for adjusting and processing pictorial information of the original picture (electrical signals bearing the pictorial information).

By causing a photoelectrically-scanning spot light to advance successively in spots and shifting the exposure unit in synchronization with the scanning, it is possible to obtain easily an original printing film having a halftone picture in which the dot area percentage at the control point (Y) is equal to a dot area percentage (y) obtained in accordance with the conversion formula (1).

No particular limitation is imposed on the means and method for utilizing "the present conversion technique" in an electronic color separation apparatus or the like.

Incidentally, it is of course possible to display base densities (x) and dot area percentages (y) in relation to respective principal control points (for example, H, $M_2$, $M_1$, S, etc.), halftone characteristic curves or the like in an ON- or OFF-type at the control panel of a commercial scanner so as to facilitate the control.

(iii) Conformity between values computed in accordance with "the present conversion method" and actual values:

The effectiveness of "the present conversion method" was next evaluated by comparing values [the relationship between base densities (x) and their corresponding dot area percentages (y)] computed by "the present conversion method" with actual values of companies which are performing color separation by means of a color scanner. Results are shown in Table 1 and Table 2.

(1) Description of Table 1

Table 1 shows the results of a comparison between values computed in accordance with "the present conversion method" and the dot area percentages of work standard of A Company which are performing color separation by using a color scanner, Model CP-341ER, manufactured by DR-LNG RUDOLF HELL GmbH of West Germany, the standard gray scale (S.G.S.) of Eastman Kodak Company as a standard, and color films made by Eastman Kodak Company (E Company) and color films made by Fuji Photo Film Co., Ltd. (F Company) as originals.

(2) Description of Table 2

Table 2 depicts the results of a comparison between values computed in accordance with "the present conversion method" and the dot area percentages of work standard of D Company which are performing color separation by using a color scanner, Model SG-808, manufactured by Dainippon Screen Mfg. Co., Ltd., the standard gray scale (S.G.S.) of Fuji Photo Film Co., Ltd. as a standard, and color films made by Eastman Kodak Company (E Company) and color films made by Fuji Photo Film Co., Ltd. (F Company) as originals.

From the results of Tables 1 and 2, the standard dot area percentage tables and the results of the computation by "the present conversion technique" can be judged to have good conformity practically, in view of the fact that the standard dot area percentages of both A Company and D Company were set up in accordance with their workers' experiences and perception and these workers do no regard their standard dot area percent tables as the best ones and desire further improvements.

Since "the conversion method" of this invention has a high degree of freedom in operability and a high degree of responsibility to various demands as described above in connection with the features of this invention, it can easily set up a standard dot area percentage table as the best and most suitable table.

When "the present conversion method" is relied upon, the gradation of halftone of a printed picture can be controlled rationally by choosing the $DR_p$ value (the density range of the printed picture) and $\epsilon$ value appropriately on the basis of the reflection density of a printing ink (said reflection density affects $DR_p$ and $\epsilon$).

The computed values of Tables 1-2 (i.e., the computed values shown in the subsequent respective tables), namely, the values x,y can be easily determined by setting desired $y_h$, $y_s$, $\epsilon$ value and k value in a single continuous computing operation so long as a person having average knowledge uses a commercial, ordinary and simple calculator ("Sharp Pythagorean ET-509A", trade name, manufactured by Sharp Corporation was used in the experiments of the present inventors).

(iv) Experiments

Employed as a color separation characteristic curve (halftone characteristic curve) for a cyan plate (C) was pictorial information determined in accordance with the conversion formula (1) under the following conditions. An original was a positive color film having a still-life picture whose H and S areas were measured to have densities of 0.2 and 2.8 as well as a portrait whose H and S areas were determined to have densities of 0.2 and 2.70. The density of an area printed solid by a yellow plate was 0.9, from which the value $\beta$ was computed. The reflectivity ($\alpha$) of paper was 100%. At the high-light area (H) and shadow area (S) of a picture printed by the cyan plate which was the standard plate for the color separation, 3% dots and 95% dots were placed respectively. In addition, based on the color separation characteristic curve for the cyan plate (C), a characteristic curve capable of providing 2% dots at the high-light area (H), 90% dots at the shadow area (S), dots of a dot area percentage smaller by 8-10 percent in an intermediate tone than the cyan plate was determined in accordance with the conversion formula (1) by using a personal computer. This characteristic curve was employed as a color separation characteristic curve for the yellow plate (Y) and magenta plate (M).

For a black plate (BL), the conventional color separation characteristic curve was used as was. Color modification and correction were performed in the conventional manner.

Under the above-given conditions, color separation was conducted by using the scanner, Model CP-341ER, manufactured by DR-LNG RUDOLF HELL GmbH and color proof was performed with Cromalin (trade mark; product of E.I. du Pont de Nemours & Co., Inc.). It was possible to obtain extremely-satisfactory result as expected in advance.

Namely, the overall tone of the printed picture was by no means inferior to the quality of a picture printed in colors on a paper sheet and the gradation of the picture and the sharpness of its color were both satisfactory.

It was the effects of the present invention, which were not expected at the beginning, that an object having soft appearance like a blanket and an object having hard appearance like a metal product were both expressed (reproduced) well although their reproduction in a printed picture had been said to be difficult.

(v) Application of "the present conversion method" to the modification (or change) of gradation:

As already described above in connection with the features of the present invention, this invention can scientifically and rationally perform the tonal conversion of a picture (namely, the tonal conversion from a continuous tone to a halftone) as its primary function and furthermore, can also conduct the adjustment of the gradation and tone of a picture and the adjustment and control of the gradation of a picture scientifically and rationally. Therefore, the tonal conversion method of this invention can be used effectively to obtain, as a picture printed subsequent to the tonal conversion of a picture, a picture whose quality can itself be recognized as having been obtained by modifying (or changing) the original picture when observed through the eyes of a man, namely, for the modification of the original picture, in other words, for the so-called modification (or change) of the gradation of a picture.

The modification (or change) of the gradation of a picture to be printed is required, for example, when it is desired to move the position ($M_2$) of 50% dot area percentage in accordance with the degree of reduction or enlargement or to express or show the gradation of the high-light area or shadow area better (stronger).

When the dot area percentages of the smallest dot of the high-light area (H) and the largest dot of the shadow area (S) of a picture to be printed are fixed, for example, at specific values of 5% and 95% respectively, an issue arises how the setting point ($M_2$) of 50% dot area percentage, which is an extremely important control point on a picture to be printed, should be shifted in accordance with variations of the reflection density of a printing ink (a yellow ink is used as a standard) or variations of the degree of reduction or enlargement from an original picture to the printed picture in order to perform the modification or change of the gradation of the picture.

Basic data useful for the solution of a problem of the above sort are shown by way of example in Table 3.

By providing plural data as basic data in accordance with the needs of actual work, the position ($M_2$) of 50% dot area percentage can be moved rationally so that the gradation of a picture can be adjusted.

Figure 1:
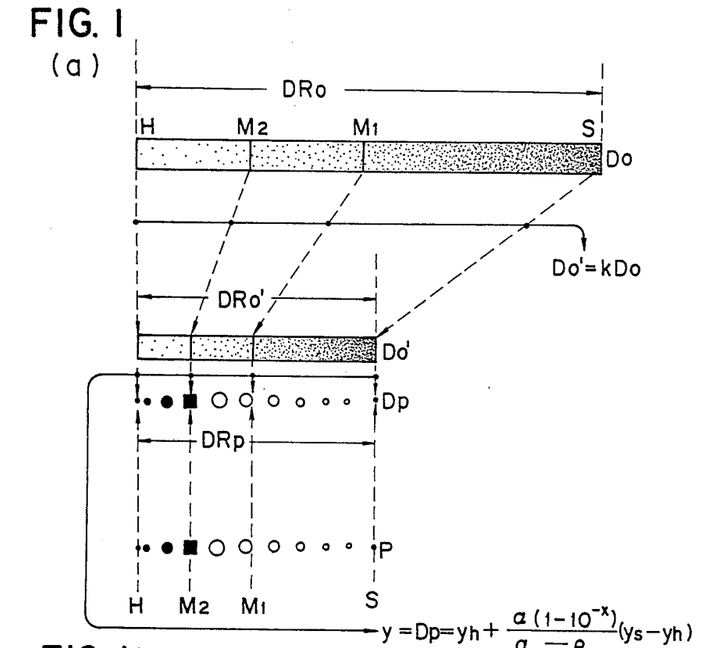
FIG. 1(a) is a schematic illustration showing one embodiment of this invention for converting an original continuous-tone picture into a halftone picture via an intermediate picture compressed in density.
FIG. 1(b) is a schematic illustration showing another embodiment of this invention for converting the original continuous-tone picture into a halftone picture via an intermediate picture compressed in density range.

The density range of each printed picture in Table 3, which corresponds to $DR_p$ in FIG. 1, is determined depending on the density of an area printed solid with a yellow ink in a set of inks employed (and the value $\beta$ can also be determined on the basis of the density range). The figure given in parentheses under each density range is the value of $\epsilon[=\alpha/(\alpha-\beta)]$. In each space (frame) of each table, the figure shown in parentheses in the upper row is the base density (x) at that control point. The figure in the lower row in each space (frame) indicates the value of a dot area percentage (y) corresponding to the base density.

Regarding the range of dots employed, dot areas 5%–95% were used in accordance with the routine practice in the present field of art. Computed values shown in Table 3 are extremely important for the control of the position of 50% dot area percentage and also for the control of the dot area percentage at the point $M_2$.

For example, it was attempted to produce a printed picture at a reduction/enlargement rate of 100% from an original color picture making use of a film made by E Company. A printed picture of desired quality was obtained when the density rage of the printed picture and $\epsilon$ value were set at 0.95 and 1.12638 respectively.

A halftone characteristic curve is then drawn on the basis of the computed values in Table 3 (namely, the characteristic curve is prepared by plotting the base density range (x) of the original picture along the axis of abscissas and the dot area percentage (y) along the axis of ordinates).

Next, the reduction/enlargement rate is changed with respect to the base plate. The position of 50% dot area percentage is shifted toward the S side for reduction but is moved toward the H side for enlargement. A halftone picture is then formed on a film.

Test pictures obtained in the above-described manner are compared with the printed halftone picture corresponding to the base plate.

The test picture having the same quality as the latter halftone picture is chosen. Let's now assume by way of example that the density range of the printed picture and $\epsilon$ value were 0.85 and 1.16449 respectively when the original picture was reduced to one half, 1.10 and 1.08629 respectively when the original picture was enlarged to 200%, and 1.25 and 1.05958 respectively when the original picture was enlarged to 400%.

Halftone characteristic curves for the above reduction/enlargement rates are then drawn. Based on the crossing points between the respective curves and a straight line indicating 50% dot area percentage, it is possible to find out the density of a control point of the original picture where 50% dot area percentage is supposed to be given (in practice, the control point is determined on a work standard gray scale representing the original picture).

It is for the convenience of inspection of a halftone picture after the color separation work that the density where 50% dot area percentage is given has been chosen as the density of control points. It is hence not necessary to limit the density to 50% dot area percentage. As an alternative, it is then possible to choose control points at positions corresponding respectively to 2/8 and 4/8 of the density range of the original picture, to determine from the halftone characteristic curve at which percentages the dot area percentages to be given to the positions are set, and then to perform color separation work under the conditions thus set.

As has been described above, it is possible to perform rationally the modification (or change) of the tone of a picture concurrently with the tonal conversion of the picture by using Table 3.

The modification (or change) of the picture is needed depending not only on the reduction/enlargement rate of a picture to be printed but also on the desire or preference of the orderer for prints, the kind of a target picture photographed in the color original, the purpose of use of the printed pictures, the whiteness of printing paper, the densities of printing inks, etc. Such modification (or change) can always be achieved rationally in accordance with Table 3. Table 3 also permits the standardization of various color separation work.

It is also feasible to perform the tonal modification (change) of a picture at its high-light and shadow areas in the same manner. By effecting the above-described tonal adjustment, any color fog in the high-light area of a color original can be automatically removed without need for any special measure.

As has been mentioned above, the tonal conversion and modification (or change) of a picture, which has heretofore been performed on the basis of the experiences and perception of a man in color separation work, can be rationalized scientifically.

(vi) Other tables computed in accordance with "the present conversion technique" and their usefulness:

Since the tonal conversion of a picture, which is the first step of the photomechanical process, especially, the color separation work and serves as a basis for the formation of a printed picture, has been dependent primarily on the experiences and perception of a man to date (the importance of the tonal conversion has been expressed by the word "tone-rendering-first-ism" in this invention), no attempt has heretofore been made to theoretically analyze the color separation work and the like on the basis of a picture to be printed.

However, "the conversion technique" of this invention has made it possible to achieve the above analysis by a scientific and rational approach.

The usefulness of "the present conversion technique" will next be demonstrated on the basis of the basic data (i.e., Table 4–Table 8) which are useful in performing a theoretical study on the most fundamental various matters in the color separation work.

It is hence possible to extract elements regarding what nature and principle exist between an original picture and its color separation work and what matters have to be watched and considered in order to achieve rational matching between such nature and principle and the practice.

Incidentally, $\alpha$ and $\beta$ were set at 100% and 0% respectively upon preparation of each table.

[Description of Table 4]

Table 4 shows in terms of dot area percentage how the density as sensed visually by a man would be affected when the reflection density of a printing ink is changed based on the density range (or contrast) of a printed picture when $\alpha = 100\%$ and $\beta = 0\%$. Since $\alpha = 100\%$ and $8 = 0\%$ are employed as bases respectively, the value of each dot area percentage is identical to a density to be recognized by visual sensation when the printed picture is observed.

[Description of Table 5]

Table 5 contains a listing of dot area percentages at individual control points, which are required for producing printed pictures of similar tone and quality (except for the overall contrast of each picture), as judged in accordance with the visual sensation of a man, by using dot area percentages in the range of from 0% to 100% when the density of a printing ink has changed.

In other words, Table 5 shows dot area percentages of respective control points on an ideal halftone characteristic curve corresponding to the maximum density of a printing ink to be used, when given conditions are ideal.

[Description of Table 6]

Similarly to Table 5, Table 6 shows dot area percentages on respective control points on an ideal halftone characteristic curve when a dot area percentage range of from 0% to 95% is used.

[Description of Table 7]

Although the basic conditions are the same as those employed in Table 6, Table 7 illustrates the area percentages of dots which are supposed to be placed at respective control points on an ideal halftone characteristic curve when the dot area range (5%–95%) employed routinely in the present field of art is used.

Incidentally, it will be understood without need for any further explanation that Table 7 is the basis of "the present conversion technique".

[Description of Table 8]

Table 8 shows how the dot area percentage at each control point has to be chosen in order to obtain an ideal halftone characteristic curve when a printed monochrome picture is produced from an original picture and the density of a printing ink (the density range of the printed picture) and the range of dots used (the range of dots used was selected following the usual method of monochrome halftone scanning in the present field of art) are changed.

It is appreciated from this table how the ideal halftone characteristic curve changes or should be changed in accordance with the range of dot area percentages to be used even if the density of a printing ink remains unchanged.

It is the basic requirement for each color separation work for the fabrication of multi-color printing plates that a monochrome picture to be printed, which is a halftone picture corresponding at 1:1 to a continuous-tone picture as an original, be formed from the original and skill must be learnt to permit the free adjustment of the tone of the monochrome picture to be printed.

By theoretically analyzing the relationship between the base densities of the continuous-tone pictures and the dot area percentages of their corresponding halftone pictures, all described above by way of example, from various angles, it has become feasible for the first time to distinguish the conversion and the modification (or change) from each other in the adjustment of the graduation of a picture, to establish a rational method for the tonal conversion and modification (or change) of the picture, and further to theoretically and scientifically determine the range, details and limitation that allow to perform the tonal conversion and tonal modification (change) at the same time.

TABLE 1

Comparison between Dot Area Percentage Calculated in Accordance with the Tonal Conversion Method of This Invention and the Corresponding Dot Area Percentage Used in Actual Color Separation Work Conversion formula: $y = y_h + \dfrac{\alpha(1 - 10^{-kx})}{\alpha - \beta}(y_s - y_h)$ $(\alpha = 1.00000; 1/(1 - \beta) = \epsilon)$ Plate-making company: A Company Scanner used: "CP-341ER" (manufactured by H Company)

S.G.S.: Standard gray step (made by E Company). Employed for the determination of the density at base density area.

Original density range: Base density range of original picture (DR$_o$): 2.24

Dot size range used: 5%–95% ($y_h = 5\%$, $y_s = 95\%$)

DR$_p$: Density range of printed picture

Dot area % computed by the "conversion formula" (y)

TABLE 1-continued

| | Density of S.G.S. made By E. Co. | Base density used for computing dot % (x) | Standard dot % of A Co. Film original made by E Co. | Standard dot % of A Co. Film original made by F Co. | Base density range 2.24 $DR_p = 1.10$ $\epsilon = 1.08629$ | Base density range 2.24 $DR_p = 1.05$ $\epsilon = 1.09785$ | Base density range 2.24 $DR_p = 1.00$ $\epsilon = 1.11111$ | Base density range 2.24 $DR_p = 0.95$ $\epsilon = 1.12638$ |
|---|---|---|---|---|---|---|---|---|
| 1 | 0.42 | 0.00 | 5.00 | 4.00 | 5.0000 | 5.0000 | 5.0000 | 5.0000 |
| 2 | 0.53 | 0.11 | 15.00 | 14.00 | 16.4344 | 16.0614 | 15.6921 | 15.3251 |
| 3 | 0.62 | 0.20 | 24.00 | 24.00 | 24.7870 | 24.1841 | 23.5829 | 22.9857 |
| 4 | 0.74 | 0.32 | 34.00 | 34.00 | 34.6820 | 33.8569 | 33.0319 | 33.2068 |
| 5 | 0.86 | 0.44 | 43.00 | 44.00 | 43.3209 | 42.3546 | 41.3834 | 40.4082 |
| 6 | 1.00 | 0.58 | 51.00 | 51.00 | 52.0242 | 50.9729 | 49.9103 | 48.8375 |
| 7 | 1.13 | 0.71 | 56.00 | 57.00 | 58.9607 | 57.8896 | 56.8007 | 55.6971 |
| 8 | 1.27 | 0.85 | 63.00 | 63.00 | 65.3742 | 64.3291 | 63.2611 | 62.1728 |
| 9 | 1.45 | 1.03 | 69.00 | 69.00 | 72.2601 | 71.2998 | 70.3119 | 68.2978 |
| 10 | 1.64 | 1.22 | 77.00 | 77.00 | 78.1578 | 77.3270 | 76.4661 | 75.5766 |
| 11 | 1.87 | 1.45 | 82.00 | 81.00 | 83.7932 | 83.1480 | 82.4741 | 81.7721 |
| 12 | 2.08 | 1.66 | 86.00 | 84.00 | 87.8034 | 87.3378 | 86.8477 | 86.3337 |
| 13 | 2.25 | 1.83 | 88.00 | 87.00 | 90.4201 | 90.0985 | 89.7228 | 89.3991 |
| 14 | 2.41 | 1.99 | 91.00 | 90.00 | 92.4633 | 92.2727 | 92.0696 | 91.8546 |
| 15 | 2.50 | 2.08 | 93.00 | 91.00 | 93.4602 | 93.3404 | 92.2122 | 93.0763 |
| 16 | 2.62 | 2.20 | 95.00 | 94.00 | 94.6410 | 94.6118 | 94.5801 | 94.5467 |
| 17 | 2.73 | 2.31 | 97.00 | 96.00 | 95.5912 | 95.6412 | 95.6931 | 95.7876 |
| 18 | 2.73 | 2.31 | 96.00 | 95.00 | 95.5912 | 95.6412 | 95.6931 | 95.7876 |
| 19 | 2.66 | 2.24 | 95.00 | 94.00 | 95.0002 | 95.0001 | 94.9999 | 94.9999 |
| 20 | — | — | — | — | — | — | — | — |

Note:
(i) Base density (x) for the computation of dot area percentages = [Density at a given control point in the S.G.S. made by E Company] − [Density of the brightest area in the S.G.S. made by E Company (0.42)]
(ii) $DR_p$ is determined by a printing ink used. In Table 1, the densities of solid areas in proofs printed respectively with 4 types of commercial yellow inks were employed. Values $\beta$ were determined based on the densities of the solid areas respectively.
(iii) k value: $DR_p/DR_o$

TABLE 2

Comparison between Dot Area Percentage Calculated in Accordance with the Tonal Conversion Method of This Invention and the Corresponding Dot Area Percentage Used in Actual Color Separation Work Conversion formula: $y = y_h + \dfrac{\alpha(1 - 10^{-kx})}{\alpha - \beta}(y_s - y_h)$ ($\alpha = 1.00000$; $1/(1 - \beta) = \epsilon$)
Plate-making company: D Company
Scanner used: "SG-808" (manufactured by D Company)
S.G.S.: Standard gray step (made by E Company)
Original density range: Base density range of original picture
($DR_o$): 2.27 and 2.35
Dot size range used: 4%–92% and 4%–95% ($y_h \simeq y_s$)
$DR_p$: Density range of printed picture

| | Density of S.G.S. made E Co. | Base density used for computing dot % (x) | Standard dot % of A Co. Film original made by E Co. | Standard dot % of A Co. Film original made by F Co. | Dot area % computed by the "conversion formula" (y) Base density range 2.27 $DR_p = 1.10$ $\epsilon = 1.08629$ | Base density range 2.27 $DR_p = 1.00$ $\epsilon = 1.11111$ | Base density range 2.35 $DR_p = 1.05$ $\epsilon = 1.09785$ | Base density range 2.35 $DR_p = 0.95$ $\epsilon = 1.12638$ |
|---|---|---|---|---|---|---|---|---|
| 1 | 0.41 | 0.00 | 4.00 | 4.00 | 4.0000 | 4.0000 | 4.0000 | 4.0000 |
| 2 | 0.53 | 0.12 | 15.00 | 16.00 | 15.97958 | 15.20591 | 15.60299 | 14.83302 |
| 3 | 0.64 | 0.23 | 23.00 | 24.00 | 25.63730 | 24.34610 | 25.05131 | 23.75447 |
| 4 | 0.77 | 0.36 | 31.00 | 33.00 | 35.62311 | 33.91212 | 34.92274 | 33.18531 |
| 5 | 0.90 | 0.49 | 40.00 | 42.00 | 44.26061 | 42.29635 | 43.55839 | 41.54130 |
| 6 | 1.05 | 0.64 | 48.00 | 52.00 | 52.78808 | 50.69174 | 52.18811 | 50.00650 |
| 7 | 1.19 | 0.78 | 53.00 | 57.00 | 59.55713 | 57.45486 | 59.12541 | 56.90909 |
| 8 | 1.32 | 0.91 | 59.00 | 62.00 | 64.96298 | 62.93057 | 64.73119 | 62.56119 |
| 9 | 1.48 | 1.07 | 66.00 | 68.00 | 70.62500 | 68.75030 | 70.67673 | 68.64123 |
| 10 | 1.67 | 1.26 | 73.00 | 73.00 | 76.15901 | 74.53978 | 76.57649 | 74.77828 |
| 11 | 1.87 | 1.46 | 78.00 | 79.00 | 80.84619 | 79.54110 | 81.65876 | 80.16678 |
| 12 | 2.06 | 1.65 | 82.00 | 82.00 | 84.42759 | 83.43902 | 85.66860 | 84.43552 |
| 13 | 2.28 | 1.83 | 86.00 | 85.00 | 87.18716 | 86.49948 | 88.70151 | 87.83940 |
| 14 | 2.41 | 2.00 | 89.00 | 88.00 | 89.33073 | 88.91941 | 91.14092 | 90.57058 |
| 15 | 2.50 | 2.10 | 91.00 | 90.00 | 90.41427 | 90.15973 | 92.38875 | 91.98648 |
| 16 | 2.65 | 2.24 | 93.00 | 91.00 | 91.74178 | 90.68542 | 93.93347 | 93.75985 |
| 17 | 2.76 | 2.35 | 95.00 | 93.00 | 92.64869 | 92.76202 | 95.00037 | 94.99983 |
| 18 | 2.76 | 2.35 | 95.00 | 93.00 | 92.64869 | 92.76202 | 95.00037 | 94.99983 |
| 19 | 2.68 | 2.27 | 92.00 | 92.00 | 92.00026 | 91.99912 | 94.23652 | 94.11071 |
| 20 | — | — | — | — | — | — | — | — |

TABLE 3

Relationship among Printed Picture Density Range, Original Picture Control Point, Base Density and Dot Area Percentage when Dot Size Range of 5%–95% Is Used.

Conversion formula: $y = y_h + \dfrac{\alpha(1 - 10^{-kx})}{\alpha - \beta}(y_s - y_h)$ ($\alpha/\alpha - \beta$ will be designated by $\epsilon$)

| Density range of printed picture($\epsilon$) | Control point of original | | | | | | | | |
|---|---|---|---|---|---|---|---|---|---|
| | H $\frac{0}{8}$ | $\frac{1}{8}$ | M$_2$ $\frac{2}{8}$ | $\frac{3}{8}$ | M$_1$ $\frac{4}{8}$ | $\frac{5}{8}$ | $\frac{6}{8}$ | $\frac{7}{8}$ | S $\frac{8}{8}$ |
| 1.40 | (0.000) | (0.175) | (0.350) | (0.525) | (0.700) | (0.875) | (1.050) | (1.225) | (1.400) |
| (1.04146) | 5.00 | 36.08 | 56.86 | 70.75 | 80.03 | 86.23 | 90.38 | 93.15 | 95.00 |
| 1.35 | (0.000) | (0.169) | (0.338) | (0.506) | (0.675) | (0.844) | (1.181) | (1.350) | |
| (1.04676) | 5.00 | 35.37 | 55.95 | 69.78 | 79.29 | 85.72 | 90.06 | 93.00 | 95.00 |
| 1.30 | (0.000) | (0.163) | (0.325) | (0.488) | (0.650) | (0.813) | (0.975) | (1.138) | (1.300) |
| (1.05276) | 5.00 | 34.65 | 54.92 | 68.95 | 78.53 | 85.17 | 89.71 | 92.85 | 95.00 |
| 1.25 | (0.000) | (0.156) | (0.313) | (0.469) | (0.625) | (0.781) | (1.938) | (1.094) | (1.250) |
| (1.05958) | 5.00 | 33.78 | 53.98 | 67.97 | 77.75 | 84.57 | 89.36 | 92.68 | 95.00 |
| 1.20 | (0.000) | (0.150) | (0.300) | (0.450) | (0.600) | (0.750) | (1.900) | (1.050) | (1.200) |
| (1.06734) | 5.00 | 33.05 | 52.92 | 66.98 | 76.93 | 83.98 | 88.97 | 92.50 | 95.00 |
| 1.15 | (0.000) | (0.144) | (0.288) | (0.431) | (0.575) | (0.719) | (0.863) | (1.006) | (1.500) |
| (1.07619) | 5.00 | 32.33 | 51.95 | 65.95 | 76.08 | 83.36 | 88.57 | 92.30 | 95.00 |
| 1.10 | (0.000) | (0.138) | (0.275) | (0.413) | (0.550) | (0.688) | (0.825) | (0.963) | (1.100) |
| (1.08629) | 5.00 | 31.61 | 50.86 | 64.99 | 75.21 | 82.71 | 88.14 | 92.12 | 95.00 |
| 1.05 | (0.000) | (0.131) | (0.263) | (0.344) | (0.525) | (0.656) | (0.788) | (0.919) | (1.050) |
| (1.09785) | 5.00 | 30.73 | 49.88 | 63.92 | 74.31 | 81.99 | 87.71 | 91.90 | 95.00 |
| 1.00 | (0.000) | (0.125) | (0.250) | (0.375) | (0.500) | (0.625) | (0.750) | (0.875) | (1.000) |
| (1.11111) | 5.00 | 30.01 | 48.77 | 62.83 | 78.38 | 81.29 | 87.22 | 91.66 | 95.00 |
| 0.95 | (0.000) | (0.119) | (0.238) | (0.356) | (0.475) | (0.594) | (0.713) | (0.831) | (0.950) |
| (1.12638) | 5.00 | 29.30 | 47.77 | 61.71 | 72.42 | 80.56 | 86.74 | 91.41 | 95.00 |
| 0.90 | (0.000) | (0.113) | (0.225) | (0.338) | (0.450) | (0.563) | (0.675) | (0.788) | (0.900) |
| (1.14402) | 5.00 | 28.59 | 46.63 | 60.68 | 71.43 | 79.80 | 86.20 | 91.19 | 95.00 |
| 0.85 | (0.000) | (0.106) | (0.213) | (0.319) | (0.425) | (0.531) | (0.638) | (0.744) | (0.850) |
| (1.16449) | 5.00 | 27.70 | 45.63 | 59.53 | 70.41 | 78.94 | 85.68 | 90.91 | 95.00 |
| 0.80 | (0.000) | (0.001) | (0.200) | (0.300) | (0.400) | (0.500) | (0.600) | (0.700) | (0.800) |
| (1.16449) | 5.00 | 27.70 | 45.63 | 59.53 | 70.41 | 78.94 | 85.68 | 90.91 | 95.00 |
| 0.75 | (0.000) | (0.094) | (0.188) | (0.281) | (0.375) | (0.469) | (0.563) | (0.656) | (0.750) |
| (1.21629) | 5.00 | 26.30 | 43.46 | 57.15 | 68.30 | 77.29 | 84.52 | 90.30 | 95.00 |
| 0.70 | (0.000) | (0.088) | (0.175) | (0.263) | (0.350) | (0.438) | (0.525) | (0.613) | (0.700) |
| (1.24926) | 5.00 | 25.62 | 42.29 | 56.07 | 67.21 | 76.42 | 83.87 | 90.02 | 95.00 |
| 0.65 | (0.000) | (0.081) | (0.163) | (0.244) | (0.325) | (0.406) | (0.488) | (0.569) | (0.650) |
| (1.28845) | 5.00 | 24.73 | 41.29 | 54.84 | 66.09 | 75.43 | 83.26 | 89.67 | 95.00 |
| 0.60 | (0.000) | (0.075) | (0.150) | (0.225) | (0.300) | (0.375) | (0.450) | (0.525) | (0.600) |
| (1.33545) | 5.00 | 24.06 | 40.10 | 53.60 | 64.95 | 74.50 | 82.54 | 89.31 | 95.00 |
| 0.55 | (0.000) | (0.069) | (0.138) | (0.206) | (0.275) | (0.344) | (0.413) | (0.481) | (0.550) |
| (1.39244) | 5.00 | 23.41 | 39.11 | 52.33 | 63.79 | 73.56 | 81.90 | 88.92 | 95.00 |
| 0.50 | (0.000) | (0.063) | (0.125) | (0.188) | (0.250) | (0.313) | (0.375) | (0.438) | (0.500) |
| (1.46248) | 5.00 | 22.77 | 37.92 | 51.25 | 62.61 | 72.60 | 81.12 | 88.61 | 95.00 | x: Base density of each control point
y: Dot area percentage
$y_h$: Smallest dot (5%) to be applied to the high-light area of a picture to be printed.
$y_s$: Largest dot (95%) to be applied to the shadow area of a picture to be printed.
$\alpha$: Whiteness (reflectivity) of printing paper ($\alpha = 100\%$ in this table)
$\beta$: Surface reflectivity of printing ink
( ): Base density at each control point

TABLE 4

Relationship between Density Range of Printed Picture and Theoretical Dot Area Percentage
(Total Control points of original picture: $\frac{1}{8}$ of original picture density range and dot size range)

(Unit: percent)

| Density range of printed picture | Control point of original | | | | | | |
|---|---|---|---|---|---|---|---|
| | H $\frac{0}{8}$ | $\frac{1}{8}$ | M$_2$ $\frac{2}{8}$ | $\frac{3}{8}$ | M$_1$ $\frac{4}{8}$ | $\frac{6}{8}$ | S $\frac{8}{(8)}$ |
| 1.60 | 0.000 | 36.904 | 60.189 | 74.881 | 84.151 | 93.690 | 97.488 |
| 1.55 | 0.000 | 36.027 | 59.074 | 73.758 | 83.212 | 93.125 | 97.182 |
| 1.50 | 0.000 | 35.137 | 57.830 | 72.647 | 82.217 | 92.501 | 96.838 |
| 1.45 | 0.000 | 34.083 | 56.649 | 71.424 | 81.164 | 91.834 | 96.452 |
| 1.40 | 0.000 | 33.166 | 55.332 | 70.146 | 80.047 | 91.089 | 96.019 |
| 1.35 | 0.000 | 32.236 | 54.080 | 68.811 | 78.865 | 90.295 | 95.533 |
| 1.30 | 0.000 | 31.293 | 52.685 | 67.491 | 77.612 | 89.407 | 94.988 |
| 1.25 | 0.000 | 30.177 | 51.359 | 66.037 | 76.286 | 88.465 | 94.377 |
| 1.20 | 0.000 | 29.205 | 49.881 | 64.519 | 74.881 | 87.411 | 93.690 |
| 1.15 | 0.000 | 28.221 | 48.477 | 62.932 | 73.393 | 86.291 | 92.921 |
| 1.10 | 0.000 | 27.222 | 46.912 | 61.363 | 71.816 | 85.037 | 92.057 |
| 1.05 | 0.000 | 26.039 | 45.424 | 59.635 | 70.146 | 83.707 | 91.082 |

TABLE 4-continued

Relationship between Density Range
of Printed Picture and Theoretical Dot Area Percentage
(Total Control points of original picture: ⅛
of original picture density range and dot size range)

(Unit: percent)

| Density range of printed picture | Control point of original | | | | | | |
|---|---|---|---|---|---|---|---|
| | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{(8)}$ |
| 1.00 | 0.000 | 25.011 | 43.766 | 57.830 | 68.377 | 82.217 | 90.000 |
| 0.95 | 0.000 | 23.967 | 42.190 | 55.945 | 66.503 | 80.636 | 88.780 |
| 0.90 | 0.000 | 22.910 | 38.765 | 54.080 | 62.416 | 78.865 | 87.411 |

TABLE 5

Relationship between Density Range
of Printed Picture and Theoretical Dot Area Percentage
(Total Control points of original picture: ⅛ of
original picture density range and dot size range)
Dot area size range used: 0%–100%

(Unit: percent)

| Density range of printed picture | Control point of original | | | | | | |
|---|---|---|---|---|---|---|---|
| | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{(8)}$ |
| 1.60 | 0.00 | 37.86 | 61.74 | 76.81 | 86.32 | 96.10 | 100.00 |
| 1.55 | 0.00 | 37.07 | 60.78 | 75.90 | 85.63 | 95.83 | 100.00 |
| 1.50 | 0.00 | 36.28 | 59.72 | 75.02 | 84.90 | 95.52 | 100.00 |
| 1.45 | 0.00 | 35.34 | 58.73 | 74.05 | 84.15 | 95.21 | 100.00 |
| 1.40 | 0.00 | 34.54 | 57.63 | 73.05 | 83.37 | 94.86 | 100.00 |
| 1.35 | 0.00 | 33.74 | 56.61 | 72.03 | 82.55 | 94.52 | 100.00 |
| 1.30 | 0.00 | 32.94 | 55.46 | 71.05 | 81.71 | 94.12 | 100.00 |
| 1.25 | 0.00 | 31.97 | 54.42 | 69.97 | 80.83 | 93.74 | 100.00 |
| 1.20 | 0.00 | 31.17 | 53.24 | 68.86 | 79.92 | 93.30 | 100.00 |
| 1.15 | 0.00 | 30.37 | 52.17 | 67.73 | 78.98 | 92.87 | 100.00 |
| 1.10 | 0.00 | 29.57 | 50.96 | 66.66 | 78.01 | 92.37 | 100.00 |
| 1.05 | 0.00 | 28.59 | 49.87 | 65.47 | 77.01 | 91.90 | 100.00 |
| 1.00 | 0.00 | 27.79 | 48.62 | 64.26 | 75.97 | 91.35 | 100.00 |
| 0.95 | 0.00 | 27.00 | 47.52 | 63.02 | 74.91 | 90.83 | 100.00 |
| 0.90 | 0.00 | 26.21 | 44.35 | 61.87 | 71.41 | 90.22 | 100.00 |

TABLE 6

Relationship between Density Range
of Printed Picture and Dot Area Percentage
(Dot area size range used: 0%–95%)

(Unit: percent)

| Density range of printed picture | Control point of original | | | | | | |
|---|---|---|---|---|---|---|---|
| | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{8}$ |
| 1.60 | 0.00 | 35.96 | 58.65 | 72.97 | 82.00 | 91.30 | 95.00 |
| 1.55 | 0.00 | 35.22 | 57.75 | 72.10 | 81.34 | 91.04 | 95.00 |
| 1.50 | 0.00 | 34.47 | 56.73 | 71.27 | 80.66 | 90.75 | 95.00 |
| 1.45 | 0.00 | 33.57 | 55.80 | 70.35 | 79.94 | 90.45 | 95.00 |
| 1.40 | 0.00 | 32.81 | 54.74 | 69.40 | 79.20 | 90.12 | 95.00 |
| 1.35 | 0.00 | 32.06 | 53.78 | 68.43 | 78.42 | 89.79 | 95.00 |
| 1.30 | 0.00 | 31.30 | 52.69 | 67.50 | 77.62 | 89.42 | 95.00 |
| 1.25 | 0.00 | 30.38 | 51.70 | 66.47 | 76.79 | 89.05 | 95.00 |
| 1.20 | 0.00 | 29.61 | 50.58 | 65.42 | 75.93 | 88.63 | 95.00 |
| 1.15 | 0.00 | 28.85 | 49.56 | 64.34 | 75.03 | 88.22 | 95.00 |
| 1.10 | 0.00 | 28.09 | 48.41 | 63.32 | 74.11 | 87.76 | 95.00 |
| 1.05 | 0.00 | 27.16 | 47.38 | 62.20 | 73.16 | 87.30 | 95.00 |
| 1.00 | 0.00 | 26.40 | 46.20 | 61.04 | 72.18 | 86.78 | 95.00 |
| 0.95 | 0.00 | 25.65 | 45.15 | 59.86 | 71.16 | 86.29 | 95.00 |
| 0.90 | 0.00 | 24.90 | 42.13 | 58.78 | 67.83 | 85.71 | 95.00 |

TABLE 7

Relationship between Density Range
of Printed Picture and Dot Area Percentage
Dot area size range used: 5%–95%

(Unit: percent)

| Density range of printed picture | Control point of original | | | | | | |
|---|---|---|---|---|---|---|---|
| | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{8}$ |
| 1.60 | 5.00 | 39.07 | 60.56 | 74.13 | 82.68 | 91.49 | 95.00 |
| 1.55 | 5.00 | 38.37 | 59.71 | 73.31 | 82.06 | 91.25 | 95.00 |
| 1.50 | 5.00 | 37.66 | 58.74 | 72.52 | 81.41 | 90.97 | 95.00 |
| 1.45 | 5.00 | 36.80 | 57.86 | 71.65 | 80.73 | 90.69 | 95.00 |
| 1.40 | 5.00 | 36.08 | 56.86 | 70.75 | 80.03 | 90.38 | 95.00 |
| 1.35 | 5.00 | 35.37 | 55.95 | 69.78 | 79.29 | 90.06 | 95.00 |
| 1.30 | 5.00 | 34.65 | 54.92 | 68.95 | 78.53 | 89.71 | 95.00 |
| 1.25 | 5.00 | 33.78 | 53.98 | 67.97 | 77.75 | 89.36 | 95.00 |
| 1.20 | 5.00 | 33.05 | 52.92 | 66.98 | 76.93 | 88.97 | 95.00 |
| 1.15 | 5.00 | 32.33 | 51.95 | 65.95 | 76.08 | 88.57 | 95.00 |
| 1.10 | 5.00 | 31.61 | 50.86 | 64.99 | 75.21 | 88.14 | 95.00 |
| 1.05 | 5.00 | 30.73 | 49.89 | 63.93 | 74.31 | 87.71 | 95.00 |
| 1.00 | 5.00 | 30.01 | 48.77 | 62.83 | 73.38 | 87.21 | 95.00 |
| 0.95 | 5.00 | 29.30 | 47.77 | 61.71 | 72.41 | 86.75 | 95.00 |
| 0.90 | 5.00 | 28.59 | 44.91 | 60.69 | 69.26 | 86.20 | 95.00 |

TABLE 8

Relationship between Density Range of Picture Printed
in Continuous Tone and Theoretical Halftone Dot Percentage
Conversion formula: $y = k(1-10^{-kx})$  x: Picture density  y: Dot area percentage
$k = 1$, $\alpha = 100\%$, $\beta = 0\%$

| Density range of printed picture | Maximum dot area percentage | k value | H $\frac{0}{8}$ | $\frac{1}{8}$ | $M_2$ $\frac{2}{8}$ | $\frac{3}{8}$ | $M_1$ $\frac{4}{8}$ | $\frac{6}{8}$ | S $\frac{8}{8}$ |
|---|---|---|---|---|---|---|---|---|---|
| 1.60 | Control point | Density | 0.000 | 0.200 | 0.400 | 0.600 | 0.800 | 1.200 | 1.600 |
| | Dot (%) | Theoretical point | 0.000 | 36.904 | 60.189 | 74.881 | 84.151 | 93.690 | 97.488 |
| | 100% | 1.02577 | 0.00 | 37.86 | 61.74 | 76.81 | 86.32 | 96.10 | 100.00 |
| | 98% | 1.00525 | 0.00 | 37.10 | 60.50 | 74.58 | 84.59 | 94.18 | 98.00 |
| | 95% | 0.97448 | 0.00 | 35.96 | 58.65 | 72.97 | 82.00 | 91.30 | 95.00 |
| 1.55 | Control point | Density | 0.000 | 0.194 | 0.388 | 0.581 | 0.775 | 1.163 | 1.550 |
| | Dot (%) | Theoretical point | 0.000 | 36.027 | 59.074 | 73.758 | 83.212 | 93.125 | 97.182 |
| | 100% | 1.02900 | 0.00 | 37.07 | 60.78 | 75.90 | 85.63 | 95.83 | 100.00 |
| | 98% | 1.00842 | 0.00 | 36.33 | 59.57 | 74.38 | 83.91 | 93.91 | 98.00 |

TABLE 8-continued

Relationship between Density Range of Picture Printed in Continuous Tone and Theoretical Halftone Dot Percentage Conversion formula: $y = k(1-10^{-kx})$   x: Picture density   y: Dot area percentage $k = 1, \alpha = 100\%, \beta = 0\%$

| Density range of printed picture | Maximum dot area percentage | k value | H 0/8 | 1/8 | M₂ 2/8 | 3/8 | M₁ 4/8 | 6/8 | S 8/8 |
|---|---|---|---|---|---|---|---|---|---|
| | 95% | 0.97755 | 0.00 | 35.22 | 57.75 | 72.10 | 81.34 | 91.04 | 95.00 |
| 1.50 | Control point | Density | 0.000 | 0.188 | 0.375 | 0.563 | 0.750 | 1.125 | 1.500 |
| | Dot (%) | Theoretical point | 0.000 | 35.137 | 57.830 | 72.647 | 82.217 | 92.501 | 96.838 |
| | 100% | 1.03265 | 0.00 | 36.28 | 59.28 | 75.02 | 84.90 | 95.52 | 100.00 |
| | 98% | 1.01200 | 0.00 | 35.56 | 58.52 | 73.52 | 83.20 | 93.61 | 98.00 |
| | 95% | 0.98102 | 0.00 | 34.47 | 56.73 | 71.27 | 80.66 | 90.75 | 95.00 |
| 1.45 | Control point | Density | 0.000 | 0.181 | 0.363 | 0.544 | 0.725 | 1.088 | 1.450 |
| | Dot (%) | Theoretical point | 0.000 | 34.083 | 56.649 | 71.424 | 81.164 | 91.834 | 96.452 |
| | 100% | 1.03675 | 0.00 | 35.34 | 58.73 | 74.05 | 84.15 | 95.21 | 100.00 |
| | 98% | 1.01605 | 0.00 | 34.63 | 57.56 | 72.57 | 82.47 | 93.31 | 98.00 |
| | 95% | 0.98495 | 0.00 | 33.57 | 55.80 | 70.35 | 79.94 | 90.45 | 95.00 |
| 1.40 | Control point | Density | 0.000 | 0.175 | 0.350 | 0.525 | 0.700 | 1.050 | 1.400 |
| | Dot (%) | Theoretical point | 0.000 | 33.166 | 55.332 | 70.146 | 80.047 | 91.089 | 96.019 |
| | 100% | 1.04146 | 0.00 | 34.54 | 57.63 | 73.05 | 83.37 | 94.86 | 100.00 |
| | 98% | 1.02063 | 0.00 | 33.85 | 56.47 | 71.59 | 81.70 | 92.97 | 98.00 |
| | 95% | 0.98939 | 0.00 | 32.81 | 54.74 | 69.40 | 79.20 | 90.12 | 95.00 |
| 1.35 | Control point | Density | 0.000 | 0.169 | 0.338 | 0.506 | 0.675 | 1.013 | 1.350 |
| | Dot (%) | Theoretical point | 0.000 | 32.236 | 54.080 | 68.811 | 78.865 | 90.295 | 95.533 |
| | 100% | 1.04676 | 0.00 | 33.74 | 56.61 | 72.03 | 82.55 | 94.52 | 100.00 |
| | 98% | 1.02582 | 0.00 | 33.07 | 55.48 | 70.59 | 80.90 | 92.63 | 98.00 |
| | 95% | 0.99442 | 0.00 | 32.06 | 53.78 | 68.43 | 78.42 | 89.79 | 95.00 |
| 1.30 | Control point | Density | 0.000 | 0.163 | 0.325 | 0.488 | 0.650 | 0.975 | 1.300 |
| | Dot (%) | Theoretical point | 0.000 | 31.293 | 52.685 | 67.491 | 77.612 | 89.407 | 94.988 |
| | 100% | 1.05276 | 0.00 | 32.94 | 55.46 | 71.05 | 81.71 | 94.12 | 100.00 |
| | 98% | 1.03171 | 0.00 | 32.28 | 54.36 | 69.63 | 80.07 | 92.24 | 98.00 |
| | 95% | 1.00013 | 0.00 | 31.30 | 52.69 | 67.50 | 77.62 | 89.42 | 95.00 |
| 1.25 | Control point | Density | 0.000 | 0.156 | 0.313 | 0.469 | 0.625 | 0.938 | 1.250 |
| | Dot (%) | Theoretical point | 0.000 | 30.177 | 51.359 | 66.037 | 76.286 | 88.465 | 94.377 |
| | 100% | 1.05958 | 0.00 | 31.97 | 54.42 | 69.97 | 80.83 | 93.74 | 100.00 |
| | 98% | 1.03839 | 0.00 | 31.34 | 53.33 | 68.57 | 79.21 | 91.86 | 98.00 |
| | 95% | 1.00660 | 0.00 | 30.38 | 51.70 | 66.47 | 76.79 | 89.05 | 95.00 |
| 1.20 | Control point | Density | 0.000 | 0.150 | 0.300 | 0.450 | 0.600 | 0.900 | 1.200 |
| | Dot (%) | Theoretical point | 0.000 | 29.205 | 49.881 | 64.519 | 74.881 | 87.411 | 93.690 |
| | 100% | 1.06734 | 0.00 | 31.17 | 53.24 | 68.86 | 79.92 | 93.30 | 100.00 |
| | 98% | 1.04600 | 0.00 | 30.55 | 52.18 | 67.49 | 78.33 | 91.43 | 98.00 |
| | 95% | 1.01398 | 0.00 | 29.61 | 50.58 | 65.42 | 75.93 | 88.63 | 95.00 |
| 1.15 | Control point | Density | 0.000 | 0.144 | 0.288 | 0.431 | 0.575 | 0.863 | 1.150 |
| | Dot (%) | Theoretical point | 0.000 | 28.221 | 48.477 | 62.932 | 73.393 | 86.291 | 92.921 |
| | 100% | 1.07619 | 0.00 | 30.37 | 52.17 | 67.73 | 78.98 | 92.87 | 100.00 |
| | 98% | 1.05478 | 0.00 | 29.77 | 51.13 | 66.38 | 77.41 | 91.02 | 98.00 |
| | 95% | 1.02237 | 0.00 | 28.85 | 49.56 | 64.34 | 75.03 | 88.22 | 95.00 |
| 1.10 | Control point | Density | 0.000 | 0.138 | 0.275 | 0.413 | 0.550 | 0.825 | 1.100 |
| | Dot (%) | Theoretical point | 0.000 | 27.222 | 46.912 | 61.363 | 71.816 | 85.037 | 92.057 |
| | 100% | 1.08629 | 0.00 | 29.57 | 50.96 | 66.66 | 78.01 | 92.37 | 100.00 |
| | 98% | 1.06456 | 0.00 | 28.98 | 49.94 | 65.32 | 76.45 | 90.53 | 98.00 |
| | 95% | 1.03197 | 0.00 | 28.09 | 48.41 | 63.32 | 74.11 | 87.76 | 95.00 |
| 1.05 | Control point | Density | 0.000 | 0.131 | 0.263 | 0.394 | 0.525 | 0.788 | 1.050 |
| | Dot (%) | Theoretical point | 0.000 | 26.039 | 45.424 | 59.635 | 70.146 | 83.707 | 91.082 |
| | 100% | 1.09785 | 0.00 | 28.59 | 49.87 | 65.47 | 77.01 | 91.90 | 100.00 |
| | 98% | 1.07589 | 0.00 | 28.02 | 48.87 | 64.16 | 75.47 | 90.06 | 98.00 |
| | 95% | 1.04296 | 0.00 | 27.16 | 47.38 | 62.20 | 73.16 | 87.30 | 95.00 |
| 1.00 | Control point | Density | 0.000 | 0.125 | 0.250 | 0.375 | 0.500 | 0.750 | 1.000 |
| | Dot (%) | Theoretical point | 0.000 | 25.011 | 43.766 | 57.830 | 68.377 | 82.217 | 90.000 |
| | 100% | 1.11111 | 0.00 | 27.79 | 48.62 | 64.26 | 75.97 | 91.35 | 100.00 |
| | 98% | 1.08889 | 0.00 | 27.23 | 47.66 | 62.97 | 74.46 | 89.53 | 98.00 |
| | 95% | 1.05556 | 0.00 | 26.40 | 46.20 | 61.04 | 72.18 | 86.78 | 95.00 |
| 0.95 | Control point | Density | 0.000 | 0.119 | 0.238 | 0.356 | 0.475 | 0.713 | 0.950 |
| | Dot (%) | Theoretical point | 0.000 | 23.967 | 42.190 | 55.945 | 66.503 | 80.636 | 88.780 |
| | 100% | 1.12638 | 0.00 | 27.00 | 47.52 | 63.02 | 74.91 | 90.83 | 100.00 |
| | 98% | 1.10385 | 0.00 | 26.46 | 46.57 | 61.75 | 73.41 | 89.01 | 98.00 |
| | 95% | 1.07006 | 0.00 | 25.65 | 45.15 | 59.86 | 71.16 | 86.29 | 95.00 |
| 0.90 | Control point | Density | 0.000 | 0.113 | 0.213 | 0.338 | 0.425 | 0.675 | 0.900 |
| | Dot (%) | Theoretical point | 0.000 | 22.910 | 38.765 | 54.080 | 62.416 | 78.865 | 87.411 |
| | 100% | 1.14402 | 0.00 | 26.21 | 44.35 | 61.87 | 71.41 | 90.22 | 100.00 |
| | 98% | 1.12114 | 0.00 | 25.69 | 43.46 | 60.63 | 70.00 | 88.42 | 98.00 |
| | 95% | 1.08682 | 0.00 | 24.90 | 42.13 | 58.78 | 67.83 | 85.71 | 95.00 |

We claim:

1. A method for the tonal conversion of an original continuous-tone picture into a halftone picture, which is to be reproduced, on the base of pictorial information from the original continuous-tone picture, which comprises processing the pictorial information in such a way that the base density (x) of desired control point on the original continuous-tone picture and the halftone intensity (y) of a corresponding control point on the picture to be reproduced are correlated in accordance with the following formula (1)

$$y = y_h + \frac{\alpha(1 - 10^{-kx})}{\alpha - \beta}(y_s - y_h) \qquad (1)$$

where
- $x$: the base density of the desired control point on the original continuous-tone picture, namely, a value obtained by subtracting the density at the brightest area of the original continuous-tone picture from the density at the desired control point of the original continuous-tone picture;
- $y$: the halftone intensity of the corresponding control point on the picture to be reproduced;
- $y_h$: a desired halftone intensity set for the brightest area of the picture to be reproduced;
- $y_s$: a desired halftone intensity set for the darkest area of the picture to be reproduced;
- $\alpha$: the reflectivity of a base material on which the halftone picture is to be reproduced;
- $\beta$: the surface reflectivity of a medium for visualizing the halftone picture; and
- $k$: the ration of the density range of the halftone picture to be reproduced to the density range of the original continuous-tone picture.

2. The method as claimed 1, wherein the pictorial information comprises electrical signals converted from density information which have been obtained by photoelectrically scanning the original continuous-tone picture.

3. The method as claimed in claim 1, wherein the halftone intensities $(y)$, $(y_h)$ and $(y_s)$ are each expressed in terms of dot area percentage.

4. The method as claimed in claim 1, wherein the halftone picture to be reproduced is a printed picture.

5. The method as claimed in claim 1, wherein the visualizing medium is an ink.

6. The method as claimed in claim 1, wherein the base material is a paper sheet.

* * * * *